US011473727B2

(12) United States Patent
Kawase et al.

(10) Patent No.: US 11,473,727 B2
(45) Date of Patent: Oct. 18, 2022

(54) HIGH PRESSURE GAS CONTAINER

(71) Applicant: HONDA MOTOR CO., LTD., Tokyo (JP)

(72) Inventors: Satoru Kawase, Wako (JP); Naoki Ogiwara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 16/910,782

(22) Filed: Jun. 24, 2020

(65) Prior Publication Data

US 2020/0408360 A1 Dec. 31, 2020

(30) Foreign Application Priority Data

Jun. 28, 2019 (JP) .............................. JP2019-120722

(51) Int. Cl.
*F17C 1/06* (2006.01)
*F17C 1/16* (2006.01)

(52) U.S. Cl.
CPC .................. *F17C 1/16* (2013.01); *F17C 1/06* (2013.01); *F17C 2201/0109* (2013.01); *F17C 2203/0604* (2013.01); *F17C 2203/066* (2013.01); *F17C 2205/0305* (2013.01); *F17C 2221/012* (2013.01); *F17C 2223/036* (2013.01); *F17C 2270/0184* (2013.01)

(58) Field of Classification Search
CPC ........ F17C 2205/0305; F17C 2260/037; F17C 1/02; F17C 1/04; F17C 1/06; F17C 1/08; F17C 2203/0682; F17C 2203/0602; F17C 2203/0621; F17C 2203/0624
USPC ................ 220/586, 588, 589, 590, 591, 592
See application file for complete search history.

(56) References Cited

U.S. PATENT DOCUMENTS

| 3,137,405 | A | * | 6/1964 | Gorcey | ...................... F17C 1/10 |
| | | | | | 220/62.19 |
| 9,902,288 | B2 | * | 2/2018 | Kim | ........................ B60L 50/72 |
| 10,788,161 | B2 | * | 9/2020 | Ogiwara | .......... B60K 15/03006 |
| 10,890,296 | B2 | * | 1/2021 | Ogiwara | ............. G01M 3/3236 |
| 11,124,060 | B2 | * | 9/2021 | Pelger | ................... F17C 13/123 |

(Continued)

FOREIGN PATENT DOCUMENTS

| FR | | 3015630 B1 | * | 1/2016 | ................ F17C 1/06 |
| JP | 2009-174700 A | | | 8/2009 | |

(Continued)

OTHER PUBLICATIONS

Office Action dated Dec. 22, 2020 issued over the corresponding Japanese Patent Application No. 2019-120722 with the English translation thereof.

*Primary Examiner* — Allan D Stevens
(74) *Attorney, Agent, or Firm* — Carrier Blackman & Associates, P.C.; Joseph P. Carrier; William D. Blackman

(57) ABSTRACT

In a high pressure gas container including a liner, a reinforcement layer, bosses (caps), and openings (vent holes), the reinforcement layer includes an inner side reinforcement layer that surrounds the liner, and an outer side reinforcement layer that surrounds the inner side reinforcement layer, gas guide passages that guide, to the openings (vent holes), a gas leaking from the liner are formed in the inner side reinforcement layer, and the gas guide passages are voids formed between sections of a reinforcing member by arranging alongside one another and stacking the sections of the reinforcing member along the liner.

8 Claims, 7 Drawing Sheets

(56) References Cited

U.S. PATENT DOCUMENTS

| | | | |
|---|---|---|---|
| 2009/0057319 A1* | 3/2009 | Schlag | F17C 1/06 |
| | | | 220/586 |
| 2010/0072209 A1 | 3/2010 | Hatta | |
| 2011/0240655 A1* | 10/2011 | Lindner | F17C 13/026 |
| | | | 220/589 |
| 2012/0291878 A1* | 11/2012 | Pisot | F17C 1/06 |
| | | | 137/315.01 |
| 2013/0341235 A1 | 12/2013 | Leavitt | |
| 2014/0103051 A1 | 4/2014 | Kanezaki et al. | |
| 2016/0025266 A1* | 1/2016 | Leavitt | F17C 1/06 |
| | | | 206/0.6 |
| 2017/0159884 A1* | 6/2017 | Eihusen | F17C 13/002 |
| 2018/0172207 A1 | 6/2018 | Uehara et al. | |
| 2018/0266627 A1* | 9/2018 | Ogiwara | F17C 1/02 |
| 2018/0266631 A1* | 9/2018 | Kanezaki | F17C 13/06 |
| 2018/0274725 A1* | 9/2018 | Chung | B29C 70/32 |
| 2019/0162365 A1* | 5/2019 | Chung | F17C 1/06 |
| 2020/0132253 A1* | 4/2020 | Beckner | F17C 1/16 |

FOREIGN PATENT DOCUMENTS

| | | |
|---|---|---|
| JP | 2010-077995 A | 4/2010 |
| JP | 2011-231900 A | 11/2011 |
| JP | 2012-180892 A | 9/2012 |
| JP | 2014-081014 A | 5/2014 |
| JP | 2018-155335 A | 10/2018 |
| WO | 2016/189664 A1 | 12/2016 |

* cited by examiner

HIGH PRESSURE GAS CONTAINER

CROSS-REFERENCE TO RELATED APPLICATION

This application is based upon and claims the benefit of priority from Japanese Patent Application No. 2019-120722 filed on Jun. 28, 2019, the contents of which are incorporated herein by reference.

BACKGROUND OF THE INVENTION

Field of the Invention

The present invention relates to a high pressure gas container in which a high pressure gas such as hydrogen is stored.

Description of the Related Art

In a fuel cell system, hydrogen gas serving as a fuel is stored in a high pressure gas container. Such a high pressure gas container, which is mounted, for example, on a fuel cell vehicle, is required to be both lightweight and strong. Therefore, a liner of the high pressure gas container is formed by a resin, and on the exterior thereof, a reinforcement layer is formed by a reinforcing member such as carbon fiber reinforced plastic (referred to as CFRP).

Although only slightly, the hydrogen gas permeates through the resin liner and leaks. Therefore, if a seal is provided between caps that are attached to the liner and the reinforcement layer, over the passage of time, the hydrogen gas accumulates between the liner and the reinforcement layer. Japanese Laid-Open Patent Publication No. 2011-231900 discloses that voids are formed between the liner and the reinforcement layer by providing microspheres between the liner and the reinforcement layer, and such voids are used as gas guide passages (gas exhaust passages). The gas guide passages guide the hydrogen gas that has permeated through the liner to the exterior of the high pressure gas container.

SUMMARY OF THE INVENTION

In the case of forming gas guide passages using microspheres as in Japanese Laid-Open Patent Publication No. 2011-231900, it is necessary to provide a considerable number of such microspheres between the liner and the reinforcement layer. The operation of providing the microspheres between the liner and the reinforcement layer requires time and effort, and leads to an increase in the manufacturing cost.

The present invention has been devised taking into consideration the aforementioned problems, and has the object of providing a high pressure gas container in which gas guide passages can be easily formed.

An aspect of the present invention is characterized by a high pressure gas container including:

a liner made of resin and configured to store a gas in an interior thereof;

a reinforcement layer formed outside of the liner;

a boss attached to the liner; and an opening formed in the boss and configured to release the gas, which leaks from the liner and accumulates between the liner and the reinforcement layer, to an exterior of the liner and the reinforcement layer, wherein the reinforcement layer includes an inner side reinforcement layer configured to surround the liner, and an outer side reinforcement layer configured to surround the inner side reinforcement layer, gas guide passages configured to guide, to the opening, the gas leaking from the liner are formed in the inner side reinforcement layer, and the gas guide passages are voids formed between sections of a reinforcing member by arranging alongside one another and stacking the sections of the reinforcing member along the liner.

According to the present invention, the gas guide passages can be formed by means of a simple structure in which the sections of the reinforcing member are arranged alongside one another and stacked along the liner.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Hereinafter, a preferred embodiment of a high pressure gas container according to the present invention will be presented and described in detail below with reference to the accompanying drawings.

1. CONFIGURATION OF HIGH PRESSURE GAS CONTAINER 10

Figure 1:
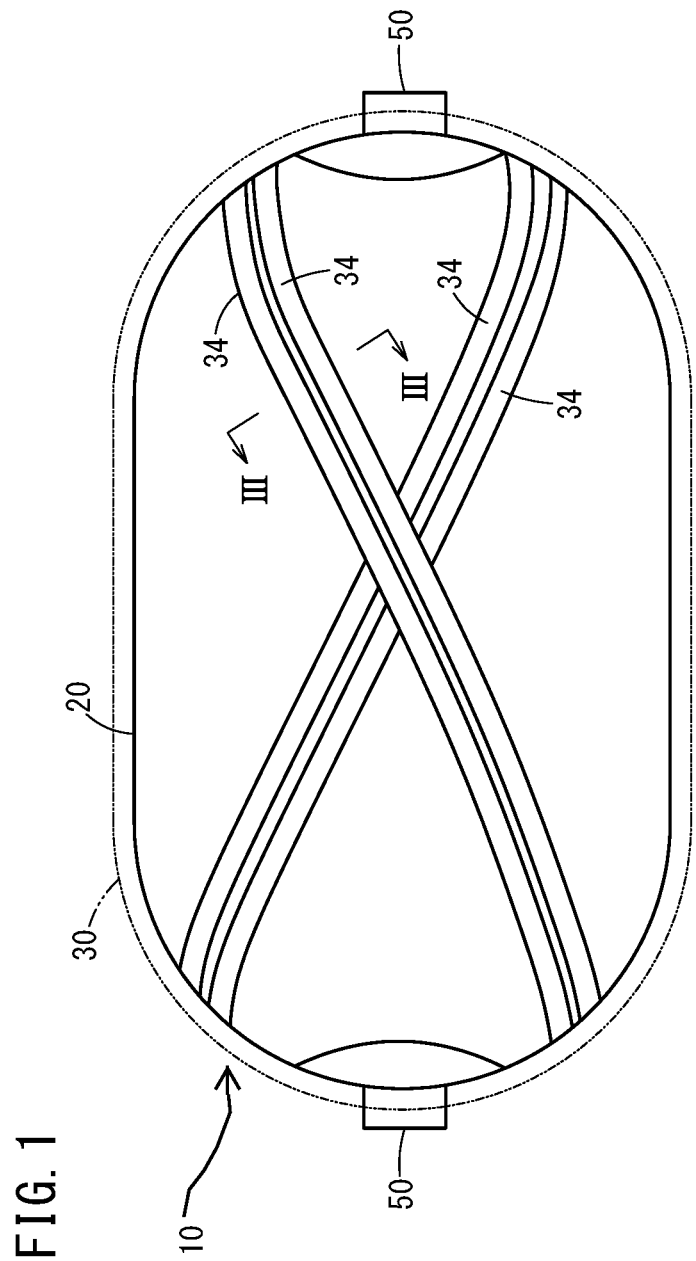
FIG. 1 is a diagram schematically showing a portion of a high pressure gas container as viewed from the side.
Figure 2:
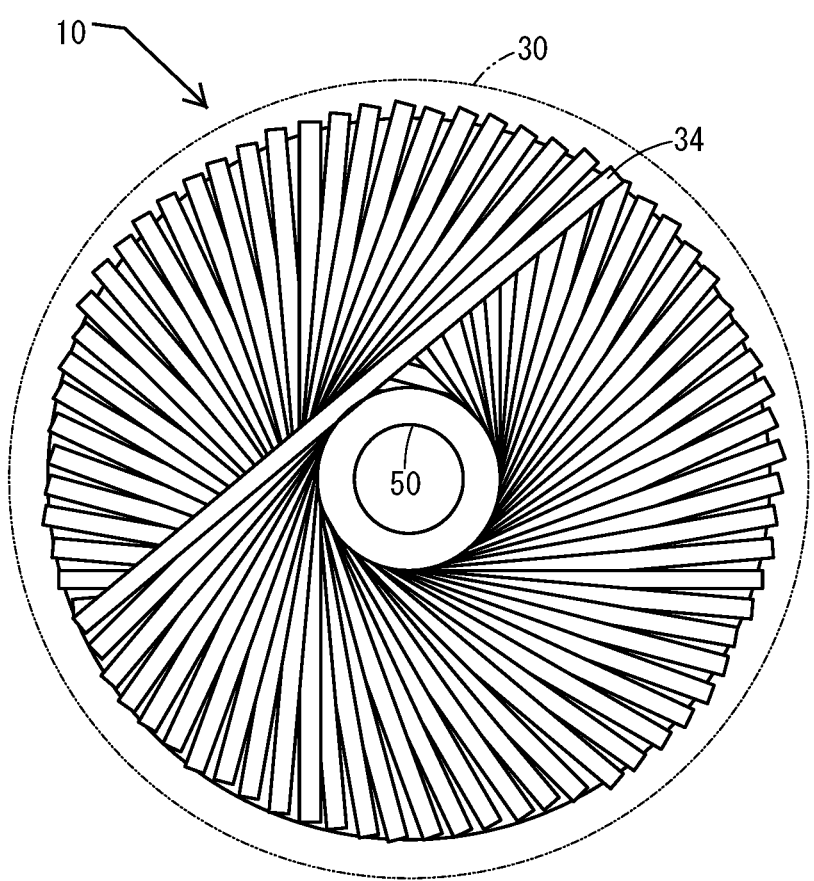
FIG. 2 is a diagram schematically showing a portion of the high pressure gas container as viewed from the front.

As shown in FIGS. 1 and 2, a high pressure gas container 10 includes a liner 20 in which a gas is stored, a reinforcement layer 30 for reinforcing the liner 20, and two caps (bosses) 50 that enable communication between the interior and the exterior of the liner 20. Moreover, in FIGS. 1 and 2, the liner 20, which is arranged on an inner side of the high pressure gas container 10, is shown by the solid line, and the reinforcement layer 30, which is arranged on the inner side of the high pressure gas container 10, is shown by the two-dot dashed line. The liner 20 is of a substantially cylindrical shape in which both end portions in the longitudinal direction are smaller in diameter than a central portion, and is formed of a resin.

Figure 3:
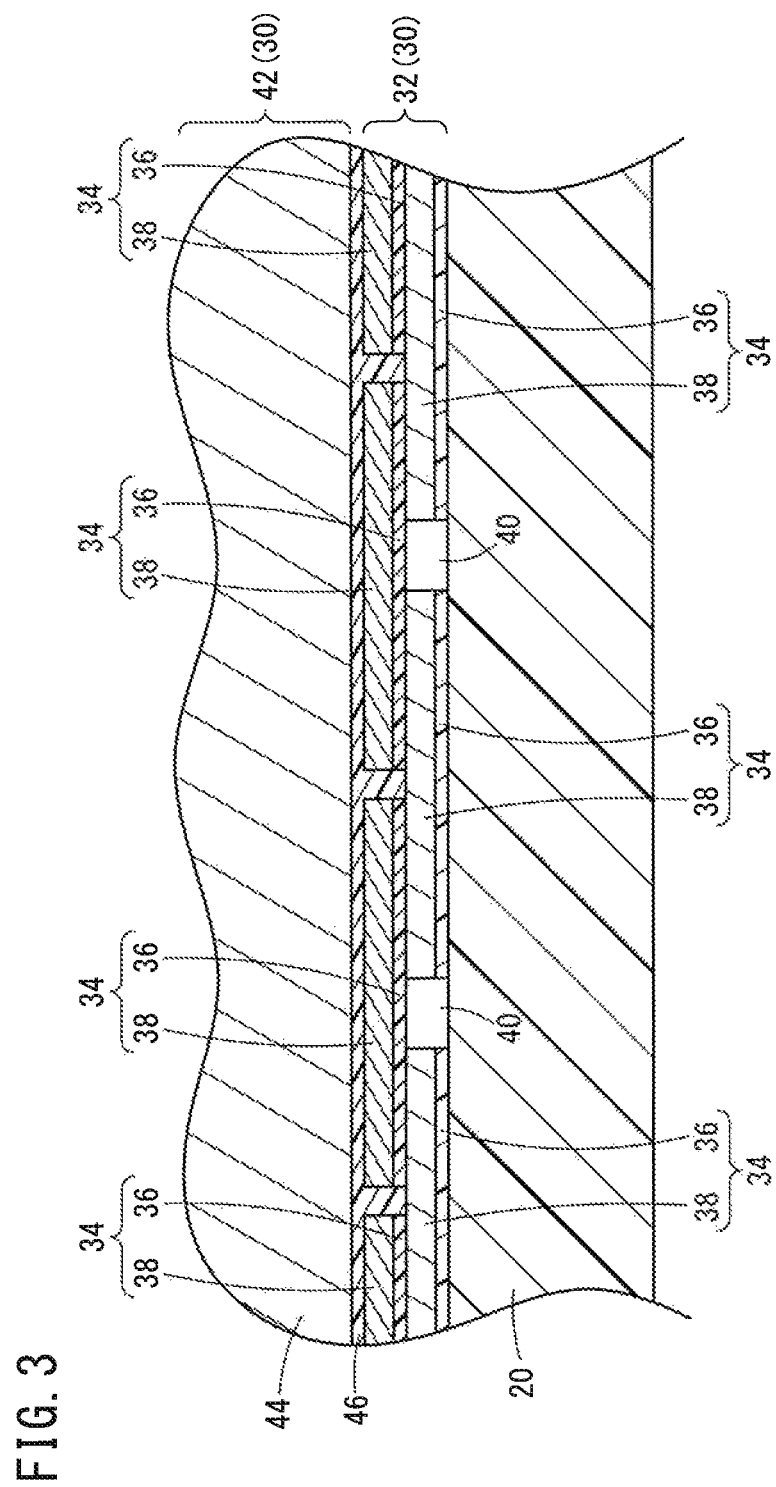
FIG. 3 is a view showing a cross section taken along line III-III in FIG. 1.

As shown in FIG. 3, the reinforcement layer 30 includes an inner side reinforcement layer 32 that surrounds the outer circumferential side of the liner 20, and an outer side reinforcement layer 42 that surrounds the outer circumferential side of the inner side reinforcement layer 32. A description will be given first concerning the inner side reinforcement layer 32.

The inner side reinforcement layer 32 is formed by a single reinforcing member 34 or a plurality of reinforcing members 34. According to the present embodiment, the reinforcing member 34 is a single strip-shaped tape in which a metal 38 is deposited on a base material 36 by way of vapor deposition. The metal 38 is preferably a substance having high thermal conductivity, for example, such as copper, silver, gold, aluminum, or the like. Further, the metal 38 that is deposited is preferably a porous material provided with fine holes therein through which the gas passes. The porous metal 38 has gas permeability.

As shown in FIGS. 1 and 2, the reinforcing member 34 is arranged on the outer circumferential side of the liner 20 by helical winding. Stated otherwise, the direction of extension of the reinforcing member 34 is arranged at an angle greater than 0 degrees and less than 90 degrees with respect to the axial direction of the liner 20. The reinforcing member 34 reciprocates between one end side and another end side of the liner 20 by way of such helical winding. The reinforcing member 34 is folded back to the other end side at the position of one of the caps 50 that is arranged at the one end side of the liner 20, and is folded back to the one end side at the position of the other of the caps 50 that is arranged at the other end side of the liner 20.

As shown in FIG. 3, in a cross section which is perpendicular to the direction of extension of the reinforcing member 34, the inner side reinforcement layer 32 has a multi-layered structure in which sections of the reinforcing member 34 are arranged alongside one another in the circumferential direction of the liner 20, and are stacked along the radial direction of the liner 20. In this instance, it is assumed that the ordinal number of the layer increases as the distance from the liner 20 increases. In addition, the layer closest in proximity to the liner 20 is referred to as a first layer.

In the first inner side reinforcement layer 32, the sections of the reinforcing member 34 are arranged alongside one another at equal intervals, and voids are formed between respective two adjacent sections of the reinforcing member 34. The voids are used as gas guide passages 40. In the second inner side reinforcement layer 32 as well, the sections of the reinforcing member 34 are arranged alongside one another at equal intervals, and voids are formed between respective two adjacent sections of the reinforcing member 34. However, voids need not necessarily be formed in the second and subsequent layers. The voids (gas guide passages 40) of the first layer are covered from above by the reinforcing member 34 of the second layer. In this manner, the gas guide passages 40 of the first layer are defined by the liner 20, the reinforcing member 34 of the first layer, and the reinforcing member 34 of the second layer. Moreover, the voids of the first layer and the voids of the second layer may overlap each other, and the voids of the first layer and the voids of the second layer may be covered by the reinforcing member 34 of a third layer. Stated otherwise, the gas guide passages 40 of an nth layer (where n is a natural number) of the inner side reinforcement layer 32 may be covered by an (n+m)th layer (where m is a natural number) of the reinforcing member 34.

The outer side reinforcement layer 42 is formed by a strip-shaped prepreg which is obtained by impregnating a CFRP 44 with a thermosetting resin 46. The strip-shaped prepreg is arranged on the outer circumferential side of the inner side reinforcement layer 32 by helical winding, in the same manner as the reinforcing member 34 of the inner side reinforcement layer 32. At this time, the strip-shaped prepreg is arranged along the sections of the reinforcing member 34. When the prepreg is disposed on the outer circumferential side of the inner side reinforcement layer 32, the thermosetting resin 46 penetrates into gaps of the inner side reinforcement layer 32. Then, the resin 46 is hardened or cured accompanying heating thereof, and bonds the outer side reinforcement layer 42 and the inner side reinforcement layer 32. However, since the gas guide passages 40 that are formed in the inner side reinforcement layer 32 of the first layer are covered by the reinforcing member 34 of the second or subsequent layers, the resin 46 does not penetrate into the gas guide passages 40.

Figure 4:
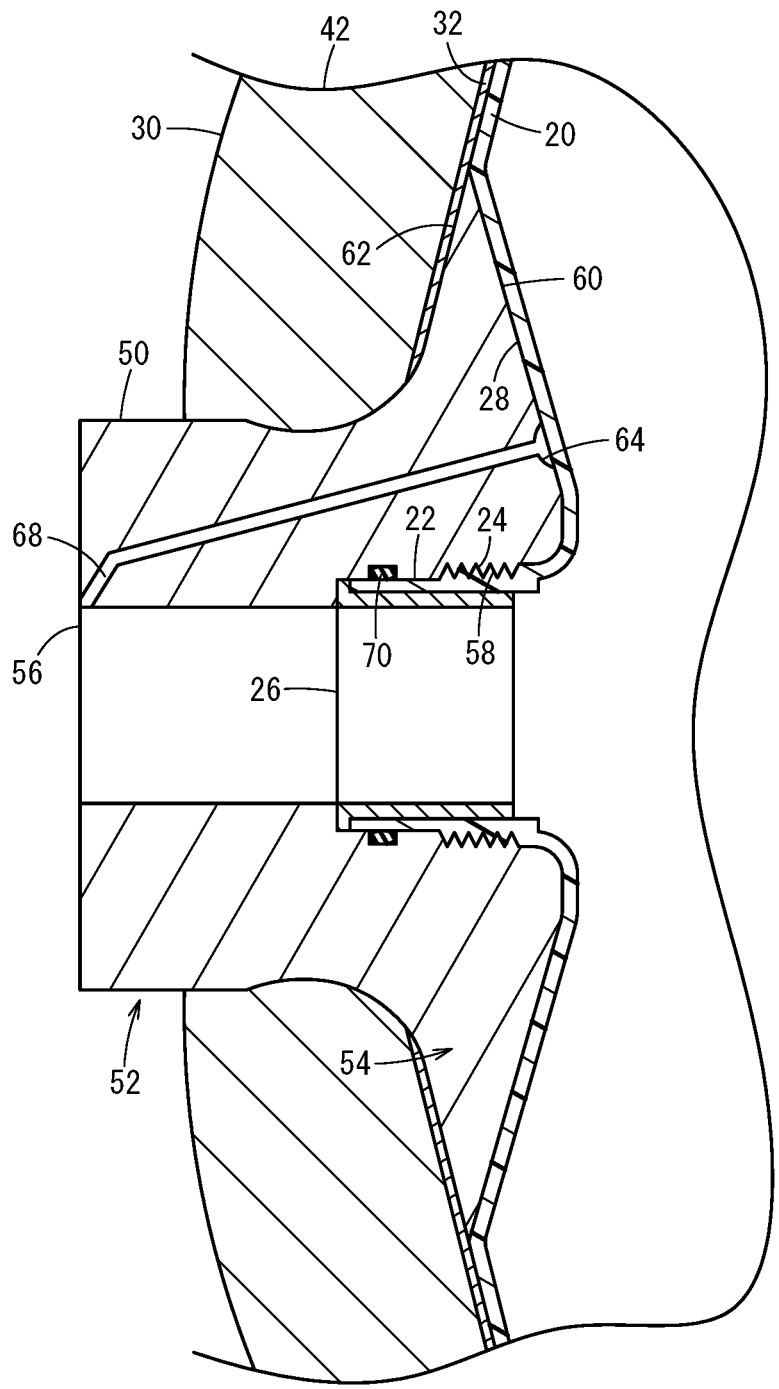
FIG. 4 is a diagram showing the structure of a cap and portions in the vicinity thereof.

As shown in FIG. 4, the caps 50 are made of a metal such as aluminum and formed in the shape of a boss. One cap 50 is arranged on each of a gas supply side and a gas discharge side. The caps 50 have a function of connecting external pipes to the high pressure gas container 10.

Each of the caps 50 has a large diameter portion 54 and a small diameter portion 52 that are formed integrally with each other. The large diameter portions 54 are positioned relatively on the side of the liner 20, and the small diameter portions 52 are positioned relatively on the opposite side from the liner 20. The length of the large diameter portions 54 is longer in the radial direction than the small diameter portions 52. Holes 56 that communicate from the side of the liner 20 to the side opposite from the liner 20 are formed in central portions of the caps 50. The holes 56 form gas flow passages. Female screw threads 58 are formed inside the holes 56 on the side of the liner 20, and male screw threads 24 formed on protruding portions 22 of the liner 20 are screwed into the female screw threads 58. Collars 26 are fitted into the protruding portions 22 of the liner 20 to provide reinforcement. O-rings 70 are provided between the holes 56 of the caps 50 and the protruding portions 22 of the liner 20.

Surfaces of the caps 50 facing the liner 20, and more specifically, surfaces of the large diameter portions 54 that face the side of the liner 20, are referred to as rear surfaces 60. The rear surfaces 60 abut against end surfaces 28 of the liner 20. One or more vent holes (openings) 64 are formed on the rear surfaces 60. The vent holes 64 communicate with the interiors of the holes 56 or with the exterior of the high pressure gas container 10 via gas discharge passages 68 formed inside the large diameter portions 54 and the small diameter portions 52.

Further, surfaces of the large diameter portions 54 on the side opposite from the rear surfaces 60 are referred to as front surfaces 62. The front surfaces 62 are covered by the inner side reinforcement layer 32. As stated previously, the majority of the inner side reinforcement layer 32 surrounds the liner 20, whereas a portion of the inner side reinforcement layer 32 covers the front surfaces 62 of the large diameter portions 54. Furthermore, the inner side reinforcement layer 32 covers boundary portions of the rear surfaces 60, the front surfaces 62, and the liner 20. Stated otherwise, the gas guide passages 40 formed in the inner side reinforcement layer 32 communicate with the rear surfaces 60 of the large diameter portions 54 of the caps 50.

Figure 5:
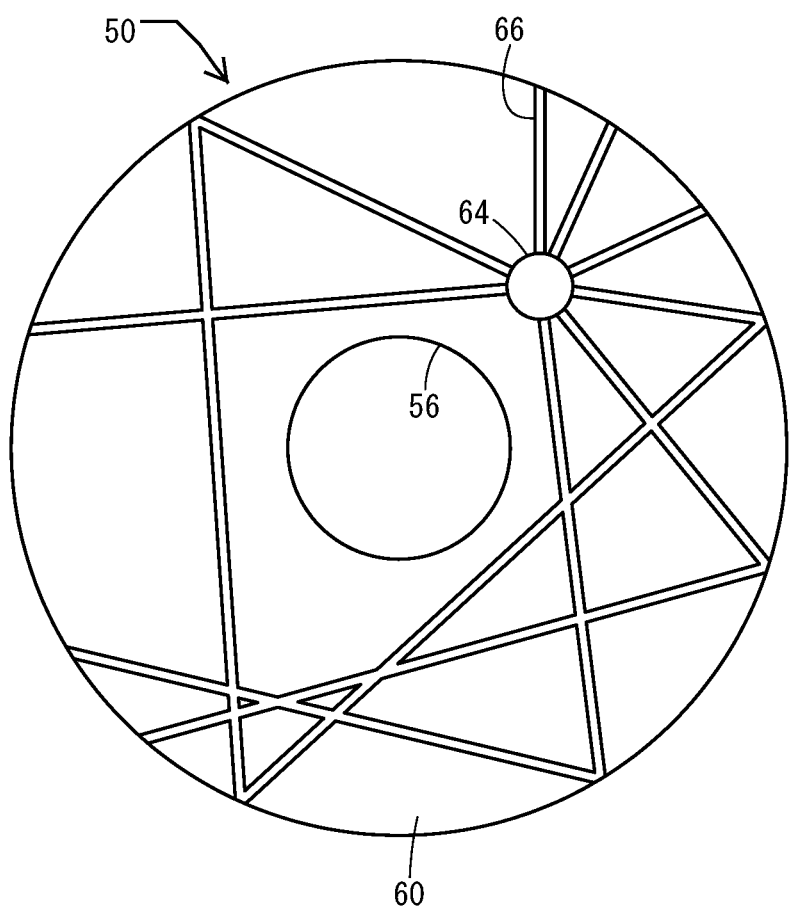
FIG. 5 is a view showing the shape of a rear surface of the cap as viewed from the side of a liner.
Figure 6:
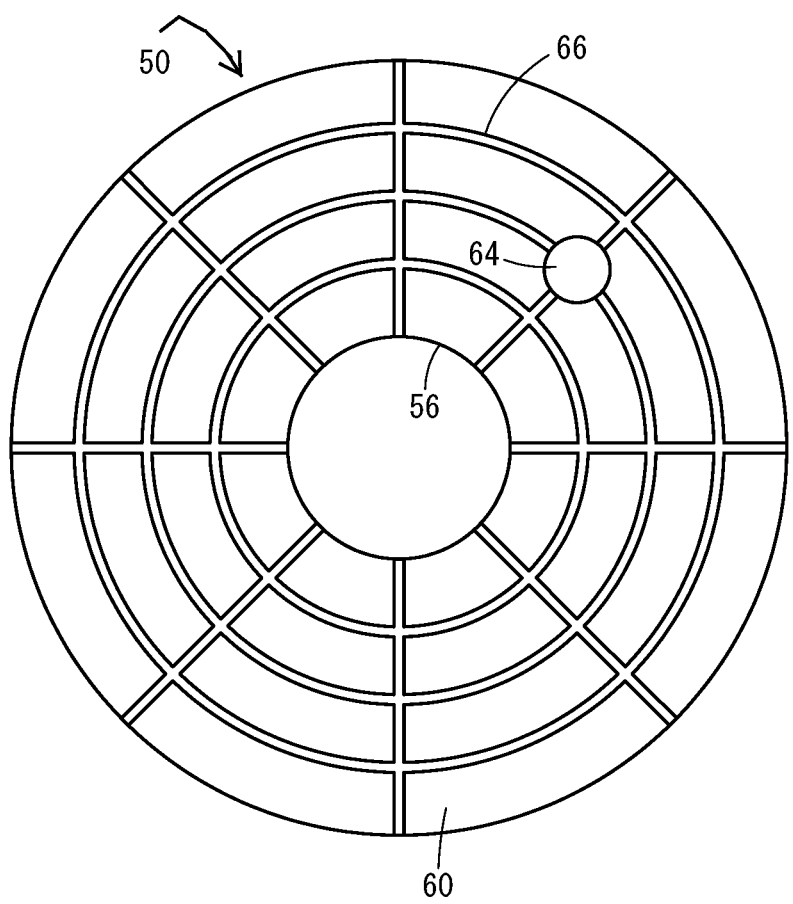
FIG. 6 is a view showing the shape of a rear surface of the cap as viewed from the side of the liner.

As shown in FIGS. 5 and 6, the vent holes 64 and gas communication sections 66 are formed on the rear surfaces 60 of the caps 50. The gas communication sections 66 are grooves having shapes that extend from the vent holes 64 (see FIG. 5), or having shapes that extend from the holes 56

(see FIG. 6). The gas communication sections 66 enable direct or indirect communication between circumferential edge portions of the rear surfaces 60 and the vent holes 64.

As was described previously, the gas guide passages 40 (see FIG. 3) that are formed in the inner side reinforcement layer 32 extend to the positions of the caps 50 along the reinforcing member 34, and communicate with the gas communication sections 66 (see FIGS. 5 and 6) that are formed in the rear surfaces 60 of the caps 50. Furthermore, the gas communication sections 66 communicate with the vent holes 64 (see FIGS. 4 to 6), and the vent holes 64 communicate with the interiors of the holes 56 or with the exterior of the high pressure gas container 10 via the gas discharge passages 68 (FIG. 4).

2. ACTIONS OF HIGH PRESSURE GAS CONTAINER 10

The gas that is stored in the liner 20 permeates through the liner 20 over the passage of time, and leaks to the exterior of the liner 20. Since the outer side reinforcement layer 42 is impermeable to the gas, the leaked gas accumulates in the gas guide passages 40 and the porous reinforcing member 34 of the inner side reinforcement layer 32. In the case that the pressure on the side of the gas guide passages 40 is higher than the pressure on the exterior of the high pressure gas container 10, the gas accumulated in the inner side reinforcement layer 32 flows through the gas guide passages 40, the gas communication sections 66, the vent holes 64, and the gas discharge passages 68, and is discharged to the exterior of the high pressure gas container 10.

When the gas is released from the liner 20, the temperature of the liner 20 decreases due to adiabatic expansion. If the temperature of the liner 20 becomes too low, there is a concern that the temperature may become lower than a lower limit of temperature at which the components of the high pressure gas container 10, for example, such as the o-rings 70, can be used. In the case that the metal 38 having high thermal conductivity is included in the reinforcing member 34 of the inner side reinforcement layer 32, heat can be transferred via the metal 38 from the caps 50 to the liner 20, and the liner 20 can be heated.

When the gas is replenished to the liner 20, the temperature of the liner 20 increases due to adiabatic expansion. In such a case, in contrast to the decrease in temperature, heat can be transferred via the metal 38 from the liner 20 to the caps 50, and the liner 20 can be cooled.

3. MODIFIED EXAMPLES

Figure 7A:
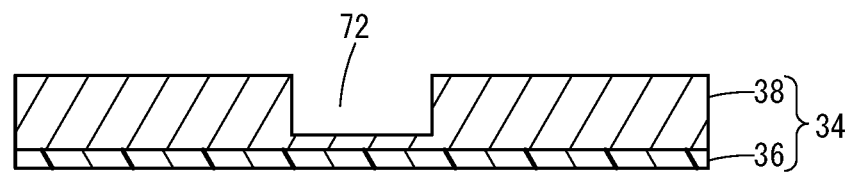
FIG. 7A and FIG. 7B are views each showing a cross section of a reinforcing member according to modified examples, taken along a plane perpendicular to a longitudinal direction thereof.
Figure 7B:
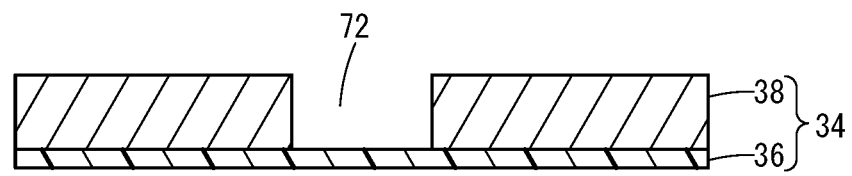

As shown in FIGS. 7A and 7B, groove-shaped gas flow passages 72 may be formed on surfaces of the reinforcing member 34. In the modified examples, the bottom surfaces of the gas flow passages 72 may be formed in the metal 38 as shown in FIG. 7A, or may be formed on the base material 36 as shown in FIG. 7B. Further, hollow gas flow passages (not shown) may be formed inside the reinforcing member 34.

The reinforcing member 34 that has gas permeability allows the resin 46 to pass more easily therethrough than the reinforcing member 34 that does not have gas permeability. Thus, the reinforcing member 34 on a side facing the CFRP 44 may be subjected to a water repellent treatment. By subjecting the reinforcing member 34 to such a water repellent treatment, it is possible to prevent the resin 46 from passing through the reinforcing member 34 and penetrating into the gas flow passages 72.

4. TECHNICAL CONCEPTS THAT CAN BE OBTAINED FROM THE EMBODIMENT

A description will be given below concerning the technical concepts that can be grasped from the above-described embodiment.

An aspect of the present invention is characterized by the high pressure gas container 10, including:

the liner 20 which is made of resin and in which a gas is stored;

the reinforcement layer 30 formed outside the liner 20;

the bosses (the caps 50) that are attached to the liner 20; and the openings (the vent holes 64) formed in the bosses (the caps 50) and releasing the gas, which leaks from the liner 20 and accumulates between the liner 20 and the reinforcement layer 30, to the exterior of the liner 20 and the reinforcement layer 30, wherein the reinforcement layer 30 includes the inner side reinforcement layer 32 surrounding the liner 20, and the outer side reinforcement layer 42 surrounding the inner side reinforcement layer 32;

the gas guide passages 40 which guide, to the openings (the vent holes 64), the gas leaking from the liner 20 are formed in the inner side reinforcement layer 32; and the gas guide passages 40 are voids formed between sections of the reinforcing member 34 by arranging alongside one another and stacking the sections of the reinforcing member 34 along the liner 20.

In accordance with the above-described configuration, the gas guide passages 40 can be formed by means of a simple structure in which the sections of the reinforcing member 34 are arranged alongside one another and stacked along the liner 20.

In the high pressure gas container 10, the gas guide passages 40 of an nth layer (where n is a natural number) of the inner side reinforcement layer 32 may be covered by an (n+m)th layer (where m is a natural number) of the reinforcing member 34.

In accordance with the above-described configuration, the gas guide passages 40 can be formed by a simple structure and manufacturing method in which the voids are formed between respective two adjacent sections of the reinforcing member 34 in the nth layer of the inner side reinforcement layer 32, and the voids that are formed in the nth layer are covered by the (n+m)th layer of the inner side reinforcement layer 32. Further, at the time that the outer side reinforcement layer 42 is formed, the resin 46 contained within the outer side reinforcement layer 42 can be prevented from flowing into the voids that serve as the gas guide passages 40.

In the high pressure gas container 10, the reinforcing member 34 may be made of the metal 38, and may be connected to the bosses (the caps 50).

In accordance with the above-described configuration, since the liner 20 is surrounded by the reinforcing member 34 that is made of the metal 38 having high thermal conductivity, and the reinforcing member 34 is connected to the bosses (the caps 50), heat exchange can be carried out between the bosses (the caps 50) and the liner 20. Accordingly, when the gas is refilled in the high pressure gas container 10, a rise in the temperature of the high pressure gas container 10 can be suppressed, and when the gas is released from the high pressure gas container 10, a decrease in the temperature of the high pressure gas container 10 can be suppressed.

In the high pressure gas container 10, the reinforcing member 34 may have gas permeability.

In accordance with the above-described configuration, since the gas is capable of passing through not only the gas guide passages 40 but also the reinforcing member 34, the gas flow passages that are connected to the openings (the vent holes 64) of the bosses (the caps 50) can be widened.

In the high pressure gas container 10, the gas guide passages 40 may be arranged at equal intervals along the circumferential direction of the liner 20.

In accordance with the above-described configuration, the size of each of the gas guide passages 40 can be suitably adjusted.

In the high pressure gas container 10, the bosses (the caps 50) may include the gas communication sections 66 that allow communication between the openings (the vent holes 64) and the gas guide passages 40.

In accordance with the above-described configuration, the gas that passes through the gas guide passages 40 and reaches the bosses (the caps 50) can be guided more efficiently to the openings (the vent holes 64).

In the high pressure gas container 10, the bosses (the caps 50) may include the holes 56 through which the gas passes from the exterior to the interior or from the interior to the exterior of the liner 20, and the gas communication sections 66 may be grooves having shapes that extend from the openings (the vent holes 64) or the holes 56.

In the high pressure gas container 10, there may further be provided the gas discharge passages 68 that are formed in the bosses (the caps 50) and discharge the gas that leaks from the liner 20, wherein the openings (the vent holes 64) may be connected to the gas discharge passages 68.

In accordance with the above-described configuration, in the case that the amount of gas accumulated between the liner 20 and the reinforcement layer 30 is large, the gas can be discharged through the gas discharge passages 68.

The high pressure gas container according to the present invention is not limited to the above-described embodiment, and it is a matter of course that various additional or modified configurations could be adopted therein without departing from the essence and gist of the present invention.

What is claimed is:

1. A gas container comprising:
    a liner made of resin and configured to store a gas in an interior thereof;
    a reinforcement layer formed outside of the liner;
    a boss attached to the liner; and
    an opening formed in the boss and configured to release the gas, which leaks from the liner and accumulates between the liner and the reinforcement layer, to an exterior of the liner and the reinforcement layer,
    wherein the reinforcement layer includes an inner side reinforcement layer configured to surround the liner, and an outer side reinforcement layer configured to surround the inner side reinforcement layer,
    the inner side reinforcement layer and the outer side reinforcement layer are bonded by a resin;
    the inner side reinforcement layer has a multi-layered structure in which a reinforcing member is arranged and stacked on the liner,
    gas guide passages configured to guide, to the opening, the gas leaking from the liner are formed at least in an innermost layer of the inner side reinforcement layer, and
    the gas guide passages formed in the innermost layer of the inner side reinforcement layer are defined by the liner, the reinforcing member in the innermost layer of the inner side reinforcement layer and the reinforcing member in a second innermost layer of the inner side reinforcement layer,
    voids are formed between adjacent sections of the reinforcing member in an outermost layer of the inner side reinforcement layer, and
    the resin penetrates into the voids.

2. The gas container according to claim 1, wherein the gas guide passages of an nth layer (where n is a natural number) of the inner side reinforcement layer is covered by an (n+m)th layer (where m is a natural number) of the reinforcing member.

3. The gas container according to claim 1, wherein the reinforcing member is made of a metal and is connected to the boss.

4. The gas container according to claim 1, wherein the reinforcing member has gas permeability.

5. The gas container according to claim 1, wherein the gas guide passages are arranged at equal intervals along a circumferential direction of the liner.

6. The gas container according to claim 1, wherein the boss includes gas communication sections allowing communication between the opening and the gas guide passages.

7. The gas container according to claim 6, wherein
    the boss includes a hole through which the gas passes from the exterior to the interior or from the interior to the exterior of the liner, and
    the gas communication sections are grooves having shapes that extend from the opening or the hole.

8. The gas container according to claim 1, further comprising a gas discharge passage formed in the boss and configured to discharge the gas that leaks from the liner, wherein the opening is connected to the gas discharge passage.

* * * * *